T. A. EDISON.
Galvanic Batteries.

No. 142,999. Patented September 23, 1873.

Witnesses,
Chas H Smith
Harold Serrell

Inventor
Thomas A. Edison
Lemuel W. Serrell
atty.

UNITED STATES PATENT OFFICE.

THOMAS A. EDISON, OF NEWARK, NEW JERSEY.

IMPROVEMENT IN GALVANIC BATTERIES.

Specification forming part of Letters Patent No. 142,999, dated September 23, 1873; application filed November 5, 1872.

*To all whom it may concern:*

Be it known that I, THOMAS A. EDISON, of Newark, in the county of Essex and State of New Jersey, have invented an Improvement in Galvanic Batteries, of which the following is a specification:

Galvanic batteries have been made with a plate of copper at the bottom of the glass jar in which the zinc is suspended. The zinc has been attached adjustably by arms, and the copper in some instances has been a plate placed edgewise in the bottom of the cell. In all instances the sulphate of copper has been placed around and above the copper plate, and in practice it is found that the zinc becomes discolored and its efficiency is injured by a coating or deposit from the blue vitriol. I have discovered that when the sulphate of copper is placed below the copper pole of the battery the zinc pole will remain more efficient and free from deposit, that the blue-vitriol solution in the liquid of the cell will not extend above, or but little above, the copper plate, and that the battery will not require replenishing as rapidly as now usual, and will remain at a more uniform intensity.

Figure 1:
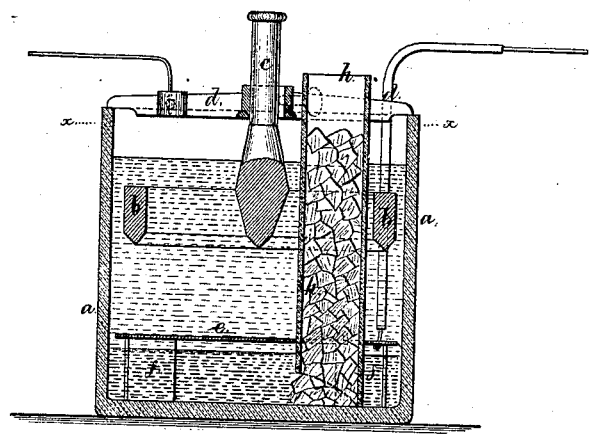
Figure 2:
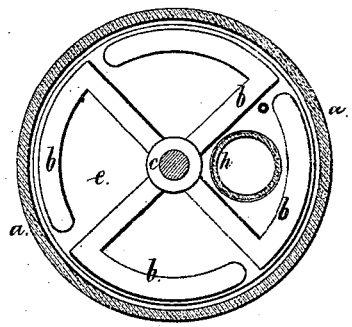

In the drawing, Figure 1 is a vertical section, and Fig. 2 is a sectional plan, at the line $x\ x$, of my said battery.

The cup or cell $a$, zinc $b$, suspending-rod $c$, arms $d$, and clamp are to be of any usual character.

In carrying out my improvement, I support or suspend the copper pole $e$ at a short distance from the bottom of the cell, say one inch, more or less. To effect this, the copper pole may have legs, $f$, resting upon the bottom of the cell, or the same may be suspended by non-conducting material, such as hard rubber, from the edges of the vessel $a$, or from the zinc pole or its support. The sulphate of copper is to be supplied below the copper pole, either by inserting the same before introducing the copper, or it may preferably be supplied through the tube $h$ that passes by the copper pole, so that the sulphate of copper introduced through the same remains below the copper and the metallic copper is deposited, and the zinc is acted upon by the acid that is liberated without the deposit of foreign matter resulting from the direct contact of the sulphate of copper with the zinc.

I do not claim a copper pole resting on short projections that serve to keep the same above any impurities in the cell.

I claim as my invention—

The arrangement, in a galvanic battery, of the horizontal copper plate above the sulphate of copper and its solution, and below the zinc pole and the liquid surrounding the same, for the purposes and substantially as set forth.

Signed by me this 31st day of October, A. D. 1872.

THOMAS A. EDISON.

Witnesses:
   GEO. T. PINCKNEY,
   CHAS. H. SMITH.